W. S. FREEMAN.
LAUNDRY BOOK.
APPLICATION FILED MAY 14, 1917.
1,240,698.
Patented Sept. 18, 1917.
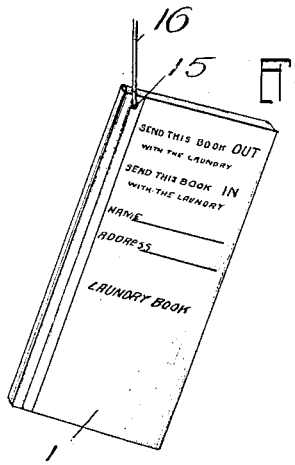
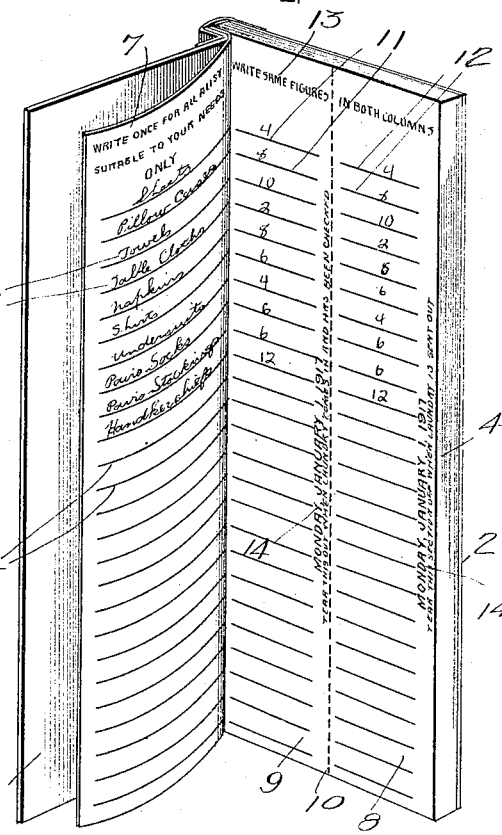
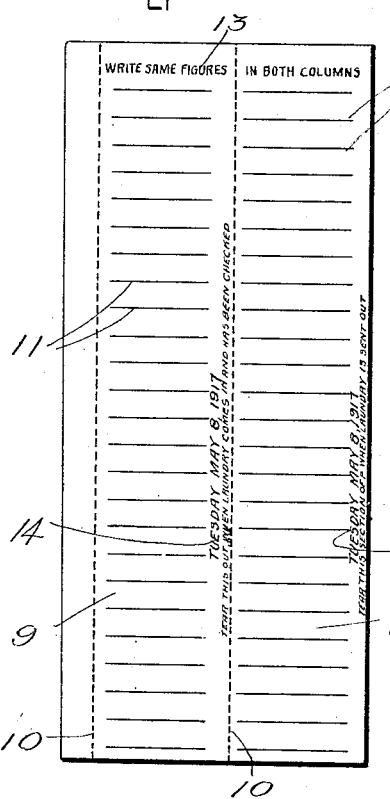
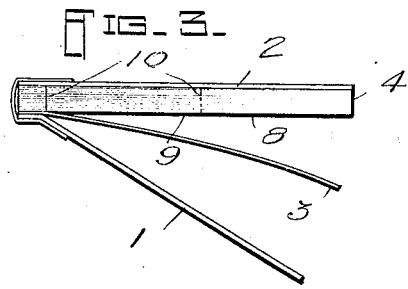
WITNESSES
John X. Phillips Jr.
W. E. Beck
INVENTOR
WILLARD S. FREEMAN,
BY
ATTORNEYS

UNITED STATES PATENT OFFICE.

WILLARD STANLEY FREEMAN, OF RICHMOND, VIRGINIA.

LAUNDRY-BOOK.

1,240,698.     Specification of Letters Patent.     Patented Sept. 18, 1917.

Application filed May 14, 1917. Serial No. 168,471.

*To all whom it may concern:*

Be it known that I, WILLARD STANLEY FREEMAN, a citizen of the United States, and a resident of Richmond, in the county of Henrico and State of Virginia, have invented new and useful Improvements in Laundry-Books, of which the following is a specification.

My invention is an improvement in laundry books, and has for its object to provide a device of the character specified, wherein a leaf is provided upon which lists of articles may be written, and a series of leaves, each partially divided into two portions that may be easily detached, the said portions having spaces thereon registering with the spaces of the first named sheet for receiving the lists of articles and adapted to be detached, the first portion of each leaf to be detached when the articles are sent to the laundry with the book, and the second portion to be detached when the articles are returned with the book.

In the drawings:

Figure 1 is a perspective view of the improved book;

Fig. 2 is a similar view enlarged, and with the book open at the leaf carrying the list of articles;

Fig. 3 is an end view of the book;

Fig. 4 is a plan view of one of the leaves.

In the present embodiment of the invention a book is provided, of suitable size, consisting of front and rear covers 1 and 2, a list leaf 3, and a series of similar leaves 4.

The leaf 3 is provided on the face adjacent to the leaves 4 with a series of lines 5, and the spaces between the lines are adapted to receive the names 6 of articles which are commonly used and which are sent to the laundry regularly. Above this list is a legend 7 giving directions for entering the list of articles, as for instance, "Write once for all a list suitable to your needs only."

All of the other leaves 4 are divided into separable portions 8 and 9 by lines 10 of partial separation, the said lines 10 permitting the portions 8 and 9 to be detached from the book. Upon these portions 8 and 9 of each leaf there are lines 11 and 12, respectively, registering with the lines 5, and at the head of the leaf is the legend "Write same figures in both columns," indicated at 13. Each portion 8 and 9 bears a date indicated at 14, the said dates of the leaves being a week apart, the first leaf bearing the date "January 1" and the year, the second, "January 8" and the year, and so on. The dates of the portions 8 and 9 are printed along the edges, and adjacent to each date is a legend, the legend on the portion 8 reading "Tear this section off when laundry is sent out", and the legend on the portion 9 reading "Tear this out when laundry comes in and has been checked."

There are fifty-two leaves 4, one for each week in the year, and upon the cover is printed the directions for the use of the book, together with spaces for the name and address of the owner of the book. Preferably, the book is provided with an opening 15 at one corner, through which may be passed a cord 16 to form a loop for connecting the book with the laundry and for hanging the same. On the leaf 3 and on the first page of the said leaf may be printed directions for the use of the book.

The improved book is simple, yet efficient for the purpose, and the lists of the articles need be written but once. It is not necessary to go over a long printed list of articles to choose out those which are put into the laundry, only those articles being written in the list which are sent to the laundry every week. The number of each article is written on the two portions 8 and 9 for the week, as shown in Fig. 2, as, for instance, in the space in alinement with the space bearing the word "Sheets" there is written "4" on each portion.

In use, the week leaf is filled up with the number of articles to be sent to the laundry, as, for instance, in Fig. 2, wherein there are four sheets, eight pillow cases, ten towels, two table cloths and so on. In alinement with "Sheets" there is written on the portions 8 and 9 the numeral "4" and so on with the other articles, the numbers being duplicated on the portions 8 and 9. When the articles are sent to the laundry the book is sent along, after first tearing off the portion 8 of the week, and this portion is retained to furnish a list of the articles sent. When the laundry has been returned, and the articles have been checked, the portion 9 may be torn out and destroyed.

I claim:

A device of the character specified, comprising a book having fifty-three leaves and a cover, one of the leaves having on the inner face thereof a series of transverse lines forming spaces for receiving a permanent list of articles, and the remaining leaves being divided by vertical lines of partial separation into two detachable portions, said portions having lines registering with the lines of the first leaf for receiving numerals indicating the number of articles for each article in the list on the first leaf, the portions of each leaf bearing the same date, and the leaves being dated corresponding to the weeks of the year.

W. STANLEY FREEMAN.

Witnesses:
L. B. MUNN,
T. R. FREEMAN.

Copies of this patent may be obtained for five cents each, by addressing the "Commissioner of Patents, Washington, D. C."